(12) United States Patent
Pettersson et al.

(10) Patent No.: US 9,914,278 B2
(45) Date of Patent: Mar. 13, 2018

(54) CREATING ON-DEMAND PACKAGING BASED ON STORED ATTRIBUTE DATA

(75) Inventors: Niklas Pettersson, Sandy, UT (US); Ryan Osterhout, West Haven, UT (US)

(73) Assignee: Packsize LLC, Salt Lake City, UT (US)

( * ) Notice: Subject to any disclaimer, the term of this patent is extended or adjusted under 35 U.S.C. 154(b) by 760 days.

(21) Appl. No.: 13/813,848

(22) PCT Filed: Aug. 2, 2011

(86) PCT No.: PCT/US2011/046327
§ 371 (c)(1),
(2), (4) Date: Nov. 19, 2013

(87) PCT Pub. No.: WO2012/018859
PCT Pub. Date: Feb. 9, 2012

(65) Prior Publication Data
US 2014/0067104 A1    Mar. 6, 2014

Related U.S. Application Data

(60) Provisional application No. 61/370,402, filed on Aug. 3, 2010.

(51) Int. Cl.
*G06Q 50/28* (2012.01)
*G06Q 10/08* (2012.01)
(Continued)

(52) U.S. Cl.
CPC .............. *B31B 49/02* (2013.01); *B31B 50/00* (2017.08); *G06Q 10/08* (2013.01); *G06Q 50/28* (2013.01)

(58) Field of Classification Search
CPC ........ G06Q 10/06; G06Q 10/08; G06Q 50/28; G06F 17/50; G06F 3/12; G05B 2219/45031; B31B 49/02
(Continued)

(56) References Cited

U.S. PATENT DOCUMENTS 5,430,831 A    7/1995  Snellen
6,615,104 B2   9/2003  England et al.
(Continued)

FOREIGN PATENT DOCUMENTS

CN    101609530     12/2009
JP    2000103406    4/2000
(Continued)

OTHER PUBLICATIONS

International Search Report and Written Opinion for PCT/US2011/046327 dated Dec. 27, 2011.
(Continued)

*Primary Examiner* — Robert Fennema
*Assistant Examiner* — Jigneshkumar Patel
(74) *Attorney, Agent, or Firm* — Workman Nydegger

(57) ABSTRACT

Methods, computer-readable media, and systems described herein relate to producing on-demand packaging. For example, packaging can be automatically produced on-demand and be sized and configured for use with a customized set of items. In one aspect, a request for multiple items is received and a packaging customization engine accesses an information store that includes information about each of the requested items. The information may include dimensional information about the three-dimensional size of the items. The packaging customization engine may use the dimensional information to simulate a model arrangement of all of the requested items, and then calculate the dimensions of a box or other package that can provide a precise fit for the items when physically arranged consistent with the model arrangement.

16 Claims, 11 Drawing Sheets

(51) Int. Cl.
 B31B 50/00 (2017.01)
 B31B 49/02 (2006.01)
(58) Field of Classification Search
 USPC .......................................................... 700/97
 See application file for complete search history.

(56) References Cited

U.S. PATENT DOCUMENTS

| | | | |
|---|---|---|---|
| 7,647,752 B2 | 1/2010 | Magnell | |
| 8,340,812 B1* | 12/2012 | Tian | ................ G06Q 10/04 |
| | | | 53/396 |
| 8,775,130 B2* | 7/2014 | Walker | .............................. 703/1 |
| 2003/0071810 A1 | 4/2003 | Shoov et al. | |
| 2003/0200111 A1 | 10/2003 | Damji | |
| 2005/0038758 A1* | 2/2005 | Hilbush | ............ G06Q 10/06311 |
| | | | 705/402 |
| 2005/0055181 A1* | 3/2005 | Verdura | .................. G06F 17/50 |
| | | | 703/1 |
| 2009/0278843 A1 | 11/2009 | Evans | |
| 2009/0313948 A1 | 12/2009 | Buckley et al. | |
| 2010/0149597 A1 | 6/2010 | Gombert et al. | |
| 2012/0072011 A1* | 3/2012 | Sarma | .................. G06F 3/1205 |
| | | | 700/216 |

FOREIGN PATENT DOCUMENTS

| | | |
|---|---|---|
| JP | 2003175918 | 6/2003 |
| JP | 2006185207 | 7/2006 |
| JP | 2007047858 | 2/2007 |
| JP | 2010001075 | 1/2010 |
| WO | 2012018859 | 2/2012 |

OTHER PUBLICATIONS

Supplementary European Search Report for European Patent Application No. 11815226 dated Jan. 20, 2014.

* cited by examiner

40

XYZ Corp
999 Westview Highway
Modesto, CA 93530
Phone: 209-555-5555
Fax: 209-555-5556

PURCHASE ORDER

DATE: 1/1/2010
CUSTOMER: 123

| CUSTOMER: |
| --- |
| ABC, LLC |
| 998 Central Ave |
| Modesto, CA 93530 |
| Phone: 209-555-4444 |
| Fax: 209-555-4445 |

| SHIP TO: |
| --- |
| ABC, LLC |
| 998 Central Ave |
| Modesto, CA 93530 |
| Phone: 209-555-4444 |
| Fax: 209-555-4445 |

42

| ITEMS | DESCRIPTION | QUANTITY | UNIT PRICE | TOTAL |
| --- | --- | --- | --- | --- |
| AA | Three of this first item | 3 | $ x.xx | |
| CC | Two of this second item | 2 | $ x.xx | |
| EE | Third item | 1 | $ x.xx | |
| FF | Fourth item | 1 | $ x.xx | |
| HH | Fifth item | 1 | $ x.xx | |
| II | Sixth item | 1 | $ x.xx | |
| KK | Seventh item | 1 | $ x.xx | |
| LL | Four of this eighth item | 4 | $ x.xx | |
| OO | Ninth item | 1 | $ x.xx | |
| PP | Tenth item | 1 | $ x.xx | |
| QQ | Eleventh item | 1 | $ x.xx | |
| RR | Nine of this twelfth item | 9 | $ x.xx | |

SUBTOTAL
TAX RATE
TAX
S&H
OTHER
TOTAL

*Fig. 3*

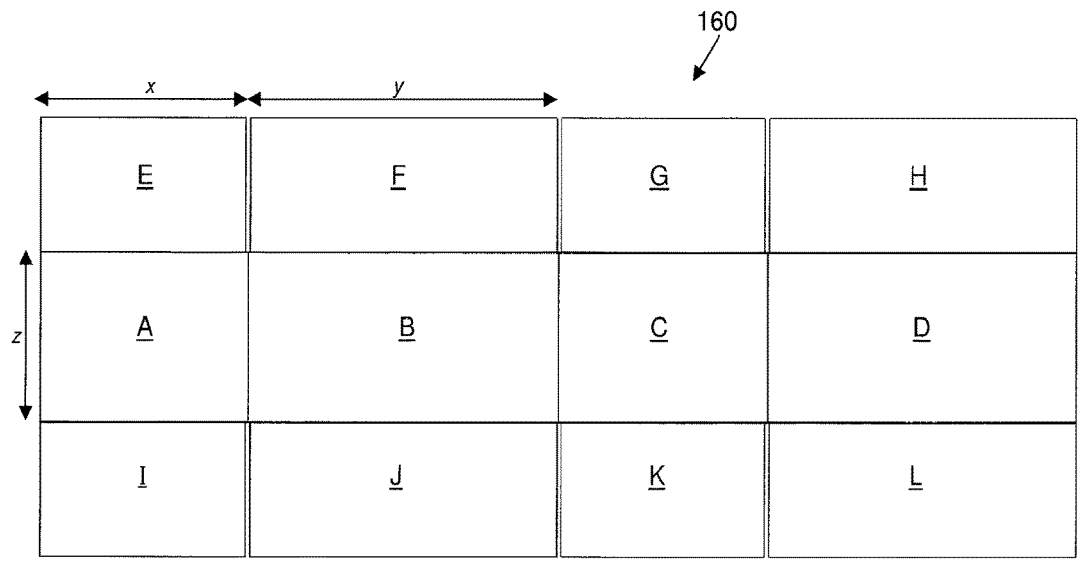
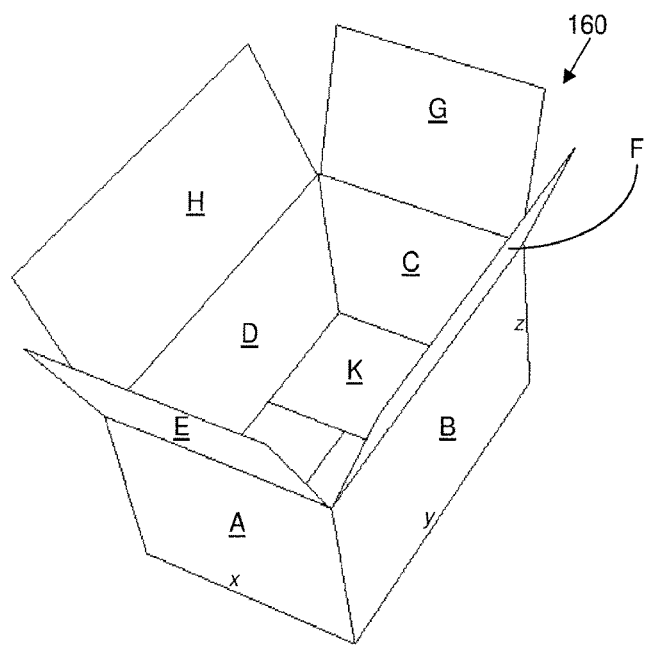
Fig. 7A

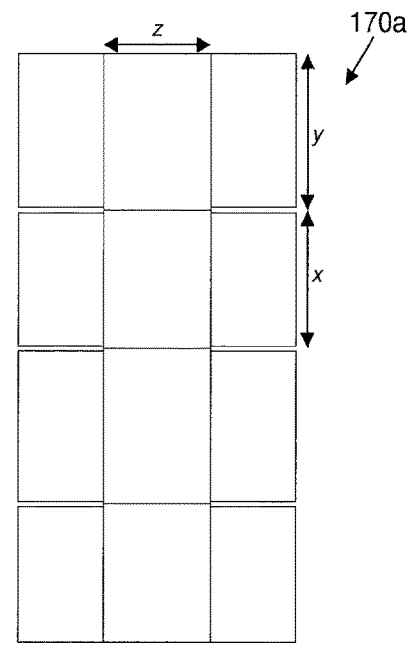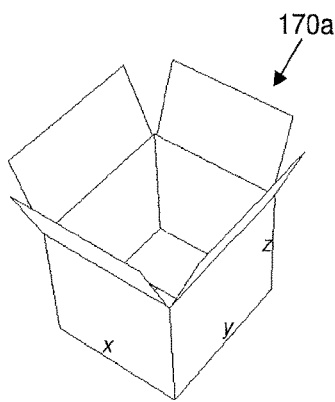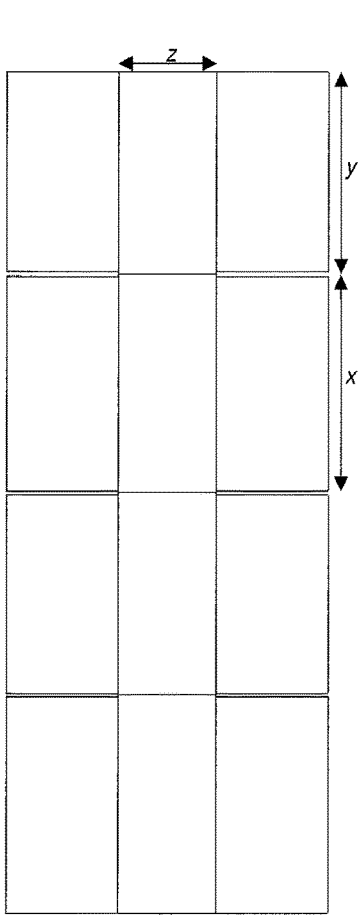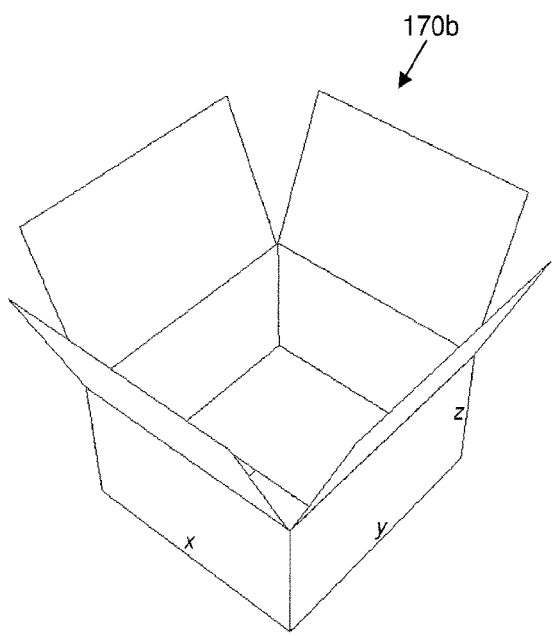
Fig. 7B

CREATING ON-DEMAND PACKAGING BASED ON STORED ATTRIBUTE DATA

RELATED APPLICATIONS

This application claims priority to and the benefit of: PCT patent application no. PCT/US2011/046327, filed on Aug. 2, 2011, entitled CREATING ON-DEMAND PACKAGING BASED ON STORED ATTRIBUTE DATA; which claims priority to and the benefit of: U.S. Provisional Patent Application No. 61/370,402, entitled "CREATING ON-DEMAND PACKAGING BASED ON STORED ATTRIBUTE DATA", filed on Aug. 3, 2010, which are incorporated herein by reference in their entirety.

BACKGROUND OF THE INVENTION

With the increasing availability of merchandise, products, and other items not only locally, but through a global market, the needs to properly package such materials for shipment and delivery have never been more important. Fortunately, available packaging systems can now be used to produce virtually any style of packaging.

Perhaps the single biggest factor in producing packaging for a product is that the packaging be designed to fit the contained product as precisely as possible. With a more precise fit, the contained item or product not only is less likely to be damaged, but the need for inner packaging is also reduced and possibly eliminated. In particular, when packaging materials such as corrugated cardboard are used to create a box or other packaging design, the materials are creased and folded as near to a right angle possible. Creasing and folding at right angles increases strength characteristics of the packaging materials (essentially exponentially), thereby giving a resulting box a correspondingly increased resistance to damage when stacked.

A standard box has twenty-four right angles making up its rectilinear form. If one or more angles deviates from a right angle by more than a particular tolerance (e.g., even by only a few degrees), other angles can also be compromised and the strength of a resulting box reduced. When strength decreases, the risk of damage or loss to the enclosed item(s) increases. Likewise when packaging fits loosely, similar risks of damage or loss can occur as the sides of the packaging can bow, the corners may sag, and the right angles that make the package strong may be lost.

Using boxes or other packaging that provide a more precise fit can thus provide a dramatic reduction in loss and damage. A more precise fit also produces other significant savings, such as, for example, reducing the amount of material used in producing a box, reducing (and potentially eliminating) inner packaging, reducing postage and handling fees, reducing time at the pack line, and/or increasing transportation yield.

Machinery for constructing a box permits a manufacturer, producer and/or vendor to key in the desired dimensions of the resulting box. The machinery then automatically generates a box template with appropriate cuts and creases. For higher volume items (either single items or collections of items), box sizes are often pre-selected and pre-fabricated since repeated sales and/or storage of such items makes it economically feasible to design a package specific to such item or collection of items.

However, it is often not feasible to pre-select box sizes and/or pre-fabricate boxes for low volume items, specialty items, unique arrangements of items, etc. For example, a retailer operating an online store may receive an order for a wide variety of different items of different sizes, shapes, and configurations, which combination would be virtually impossible to predict beforehand. Such combinations have heretofore made it difficult to produce customized packaging economically, due at least in part to the time needed to arrange and key in a box size for each order that includes multiple items. Accordingly, such effort in designing boxes generally results in various standard sized-boxes rather than custom boxes. Thus, retailers have generally been forced to choose a box from among multiple standard size boxes, and then fill in the gaps within the box with extra packaging materials.

BRIEF SUMMARY

Embodiments described herein are directed to a system for creating on-demand packaging based on stored attribute data. Embodiments described herein include systems, machines, and computer-readable media usable to efficiently and automatically produce customized packaging for a wide variety of combinations of different items and products.

One embodiment includes creating customized, on-demand packaging. One or more items that are to be included in a box or other package are identified. For each of the one or more items, dimensional information is accessed from an informational store. The dimensional information may include, for example, the size of the items in two or three dimensions. The items are arranged into a model arrangement based on the accessed dimensional information for the one or more items. The dimensions of the model arrangement are calculated. From the dimensions of the model arrangement, a customized package template for the one or more items can be produced. The customized package template can be used to produce customized packaging (e.g., a customized box) to enclose the items when the items are arranged and positioned consistent with the model arrangement.

In some embodiments, information about the items may be accessed after receiving a request for the one or more items, including a request that the one or more items be packaged together. Such a request may be an order for such items, and can include more than one item. In some cases, the multiple items are a customized order. A packaging template may also be designed based on the calculated dimensions, or the calculated dimensions can be sent to a packaging production machine to design the packaging template and/or produce the packaging template based on the dimensions of the model arrangement.

Arrangement of the items into a model arrangement may be performed in a wide variety of different manners. For example, arrangement may be performed virtually, using one or more processors. For example, a virtual arrangement may be an electronic representation of the items according to the stored dimensional information. Dimensional information may be graphical, or may be purely internally used by the processor. The model arrangement may also be optimized. For example, the model arrangement may be optimized by evaluating the volume of the one or more items, the volume of the model arrangement, the survive area of customized packaging for the model arrangement, postage, shipping or handling costs, the largest minimum dimension of the items, or other factors.

Arrangement of the items may also include producing multiple, different model arrangements. The multiple arrangements may be produced iteratively, or by using different algorithms. With the multiple arrangements, a particular model arrangement may be selected and the dimensions calculated are based on the selected model arrangement. To facilitate the production of multiple arrangements, the information store may include dimensions of the items, whether the items can be nested with other items, and/or information about cavities or nesting areas into which other items may be nested.

Arrangement of the to-be-packaged items may be performed by a packaging customization engine that optionally operates in connection with computer-readable storage media that stores instructions on how to arrange the items and/or optimize design of the model arrangement. A packaging machine may also be operable to arrange and/or optimize design, as well as to produce a packaging template by, for example, cutting the template to correspond to the dimensions calculated for the model arrangement.

Other embodiments of the invention including a system for on-demand creation and customization of packaging. The system includes one or more computer-storage media with an information store that stores dimensional attributes for multiple different items. A packaging customization engine is configured to communicate with the information store and to receive a request for customized packaging. The packing customization engine is also configured to optimize an arrangement of the to-be-packaged items to facilitate design of the customized packaging.

The packaging customization engine is also configured to receive a packaging request for customized packaging and identify the to-be-packaged items. In response to a packaging request, the packaging customization engine is configured to access the information store accessed and retrieve dimensional attributes for the to-be-packaged items. The packaging customization engine is configured to then use those dimensional attributes to develop a model arrangement of to-be-packaged items. Dimensions of a customized package may then be calculated by, for example, calculating the overall footprint or other dimensions of the model arrangement. The packaging customization engine or a packaging production machine may perform the design of the packaging template.

In further embodiments, an on-demand box design and production system is configured for automatic creation of customized boxes for any collection of items. The system includes one or more processors and at least one computer-readable storage medium. The at least one computer-readable storage medium contains an information store of three-dimensional size information about different items. A packaging customization engine that is executable by the processor to receive a request for multiple items to be boxed together. Each of the items may be found in the information store, along with information about the three-dimensional size of each of the items. The information for each of the items can be aggregated and used in optimizing a model arrangement of the items. Optimizing the items can include using the three-dimensional size information to develop a virtual model that includes each of the items. The dimensions of the virtual model can then be calculated based on the three-dimensional size information of all the items. Using the dimensions of the virtual model, the dimensions may either be used to design a box template, or transmitted to a packaging production machine. In either case, the dimensions can be used to design a box template that houses the items when they are physically positioned in a manner that corresponds to the virtual model.

Upon production of a packaging (e.g., a box) template, the packaging production machine can use the packaging template to produce packaging to contain the multiple items. The packaging production machine can use a paper-based product such as corrugated board to form the packaging. In some embodiments, fanfold corrugated board is used. The design can be optimized by automatically producing multiple arrangements and then selecting one of the multiple arrangements as satisfying desired constraints.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify various aspects of embodiments of the present invention, a more particular description of the invention will be rendered by reference to specific embodiments thereof which are illustrated in the appended drawings. It is appreciated that these drawings depict only typical embodiments of the invention and are therefore not to be considered limiting of its scope, nor are the figures necessarily drawn to scale. The invention will be described and explained with additional specificity and detail through the use of the accompanying drawings in which:

FIG. 3 illustrates a purchase order for a variety of products included within the product information store of FIG. 1;

FIGS. 7A-7C illustrate example box templates and boxes for the product configurations of FIGS. 6A-6C.

DETAILED DESCRIPTION

Example embodiments of the present invention are directed to a system for creating on-demand packaging. More particularly, exemplary embodiments of the present invention are directed to systems, machines, and computer-readable media usable to efficiently and automatically produce customized packaging for a wide variety of combinations of different items and products. Accordingly, example embodiments of the present invention may be utilized to efficiently produce packaging that is customized for unique combinations of items in a manner that reduces the likelihood of damage or loss to the items, reduces consumption of packaging materials and supplies, reduces handling costs, and/or reduces packaging time.

Figure 1:
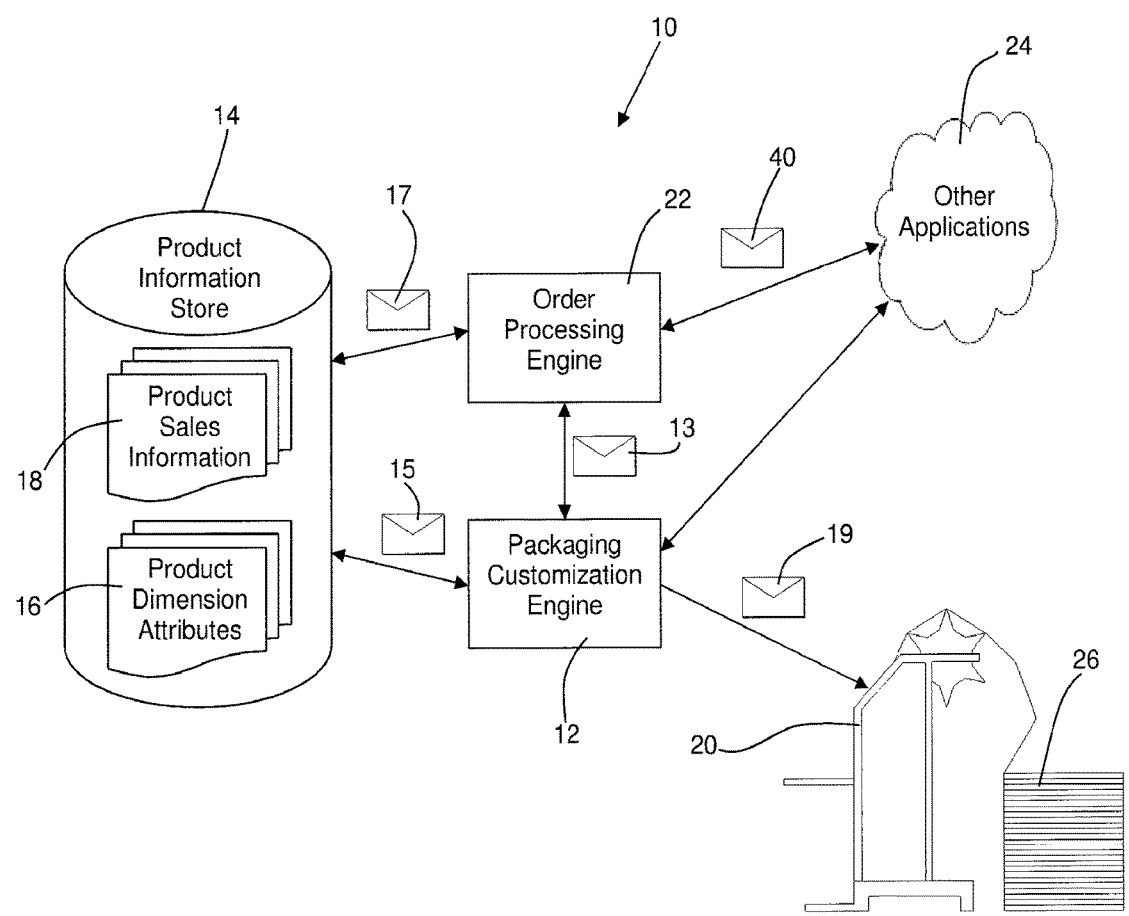
FIG. 1 illustrates a system architecture including a packaging customization engine and a product information store.

With reference now to FIG. 1, one example embodiment of an on-demand packaging system 10 is illustrated, and includes a packaging customization engine 12 communicatively coupled to a product information store 14. In the illustrated embodiment, product information store 14 includes a variety of types of information, including product dimension attributes 16 and product sales information 18. It should be appreciated in view of the disclosure herein, that while product dimension attributes 16 and product sales information 18 are illustrated as separate collections of information, they may also be integrated into a single file, table, or other collection of data. Accordingly, product information store 14 is merely one example of a suitable information store, and any suitable type of data store may be used. For example, product information store 14 may include a relational database, a hierarchical database, a network database, an in-memory database, an object-oriented database, a data warehouse, any other suitable store or database for maintaining information, or a combination thereof. Indeed, in some embodiments, product information store 14 may comprise a single physical database, whereas in other embodiments, product information store 14 may be distributed over multiple different physical locations.

In the illustrated embodiment, packaging customization engine 12 is further coupled to a packaging machine 20. Packaging machine 20 is one example of an on-demand packaging machine that can be used to produce packaging of different types and varieties according to inputs provided manually and/or by packaging customization engine 12. For example, as described in greater detail herein, packaging machine 20 may receive input from packaging customization engine 12 to produce a template for a package that is customized for one or more products.

As further illustrated in FIG. 1, packaging customization engine 12 is optionally coupled to an order processing engine 22. According to one example embodiment, on-demand packaging system 10 is utilized in connection with a retailer or manufacture that provides one or more different products. In one example embodiment, such a retailer may receive an order for one or more products at order processing engine 22. For example, a consumer at a retail store may request a certain quantity of products, and a salesman may enter the purchase information directly into order processing engine 22, or into one of the other applications 24 which may then communicate the information to order processing engine 22 (e.g., using message 40). In another example, a customer may enter purchase information directly, such as by using a web browser or other application 24 on a computing device that is network connected to order processing engine 22.

Regardless of the manner of receipt of the order information, order processing engine 22 may receive a request that one or more items have been ordered by a particular consumer and are to be stored and/or delivered to such consumer. When order processing engine 22 receives the request, order processing engine 22 may also access product information store 14. For example, order processing engine 22 may send a message 17 requesting access to product sales information 18, in response to which a response is provided that includes information about pricing, availability, shipping costs, and the like associated with such products ordered. Optionally, order processing engine 22 may also communicate information it has received from product information store 14 to the consumer. For example, order processing engine may send to the consumer an order summary, purchase order, pricing information, delivery tracking information, and the like, any of which may include information from product sales information 18. Product sales information 18 may also be updated by order processing engine 18 to add, delete, change, or otherwise edit a new or existing purchase order.

According to one embodiment, after order processing engine 22 has received an order for one or more items, order processing engine 22 communicates with packaging customization engine 12 to indicate that packaging for the ordered items is needed. Such communication may occur at any time after order processing engine 22 has received the order. For example, order processing engine 22 may send notice of the order to packaging customization engine 12 at the time the order is received, or at the time the ordered items are ready for shipment.

Information provided by order processing engine 22 to packaging customization engine 12 may take any form and, in one embodiment, takes the form of an electronic message 13 that requests customized packaging engine 12 produce a customized package—such as a box—that will be used for the storage and/or shipment of the items ordered (e.g., ordered through message 40). In sending such a request 13, order processing engine 22 may send information about the products ordered directly to packaging customization engine 12, may send a reference to product sales information 18, may send an order number usable by packaging customization engine 12 to access the order in product sales information 18, or may provide information in any other way that allows packaging customization engine 12 to identify which products have been ordered.

Further, according to some embodiments it may not be necessary for order processing engine 22 to provide any information about the order to packaging customization engine 12. For example, a shipment system (not shown) may connect with order processing engine 22. At the time shipment is desired, the shipment system may send a request for customized packaging to packaging customization engine 12, such that no direct communication from order processing engine 22 to packaging customization engine 12 is necessary. It should also be appreciated that while order processing engine 22, packaging customization engine 12, and the shipment system are shown and/or described separately, one or more may also be integrated into a single system or engine. For example, order processing engine 22 may also include packaging customization engine 12 as a part thereof.

With continued reference to FIG. 1, when packaging customization engine 12 receives request 13 for customized packaging, or some other information identifying products ordered, packaging customization engine 12 may access product dimension attributes 16 and/or obtain additional information about the ordered products. For example, packaging customization engine 12 can send a query message 15 to product information store 14 to request dimensional information about the ordered products. For example, and as discussed in more detail with regard to FIG. 2, product dimension attributes 16 that are provided in response to query message 15 may include information about the dimensions of each item that is a part of the same order. Such dimensions may include height, width, length, radius of curvature, and other information that can be used by packaging customization engine 12 to develop an arrangement of the products ordered so that the overall dimensions for a customized package design can be calculated.

Once packaging customization engine 12 has accessed the dimensional attributes of the products and developed an arrangement, packaging customization engine 12 may also design a packaging template. In particular, packaging customization engine 12 may use the height, length, width, and/or other information of the created arrangement to identify the footprint of a box or other package needed to enclose the arrangement of items as calculated by packaging customization engine 12, and then design a template corresponding to such footprint. Such a design may, however, be instead performed by packaging machine 20. For example, packaging customization engine 12 may develop an arrangement of ordered items, and then supply the dimensions of the arrangement or of desired packaging to packaging machine 20 (e.g., by sending message 19), to allow packaging machine 20 to design the packaging template.

Packaging machine 20 may also have access to packaging materials 26 of one or more types and/or sizes. For example, according to one embodiment, packaging machine 20 is fed fanfold corrugated cardboard of one or more sizes. Based on the dimensions of the package needed for a particular order, packaging machine 20 can then selectively feed enough of the fanfold corrugated cardboard to cut fanfold material into a desired box template, as well as make any necessary cuts, creases, perforations, score lines, and the like. The box template may then be assembled manually, or automatically, and the ordered products can be inserted therein.

While on-demand packaging system 10 has been discussed primarily with reference to satisfying an order from a customer, it should be appreciated in view of the disclosure herein that this is merely exemplary, and that in other embodiments packaging customization engine 12 may operate without any order being placed. For example, packaging customization engine 12 may receive information about a variety of objects that the owner or operator of system 10 desires to store, package, or ship, independent of any particular order. Indeed, system 10 may be used to produce customized packaging of any type once it is known which items are to be packaged, regardless of the reason such packaging is requested.

Figure 2:
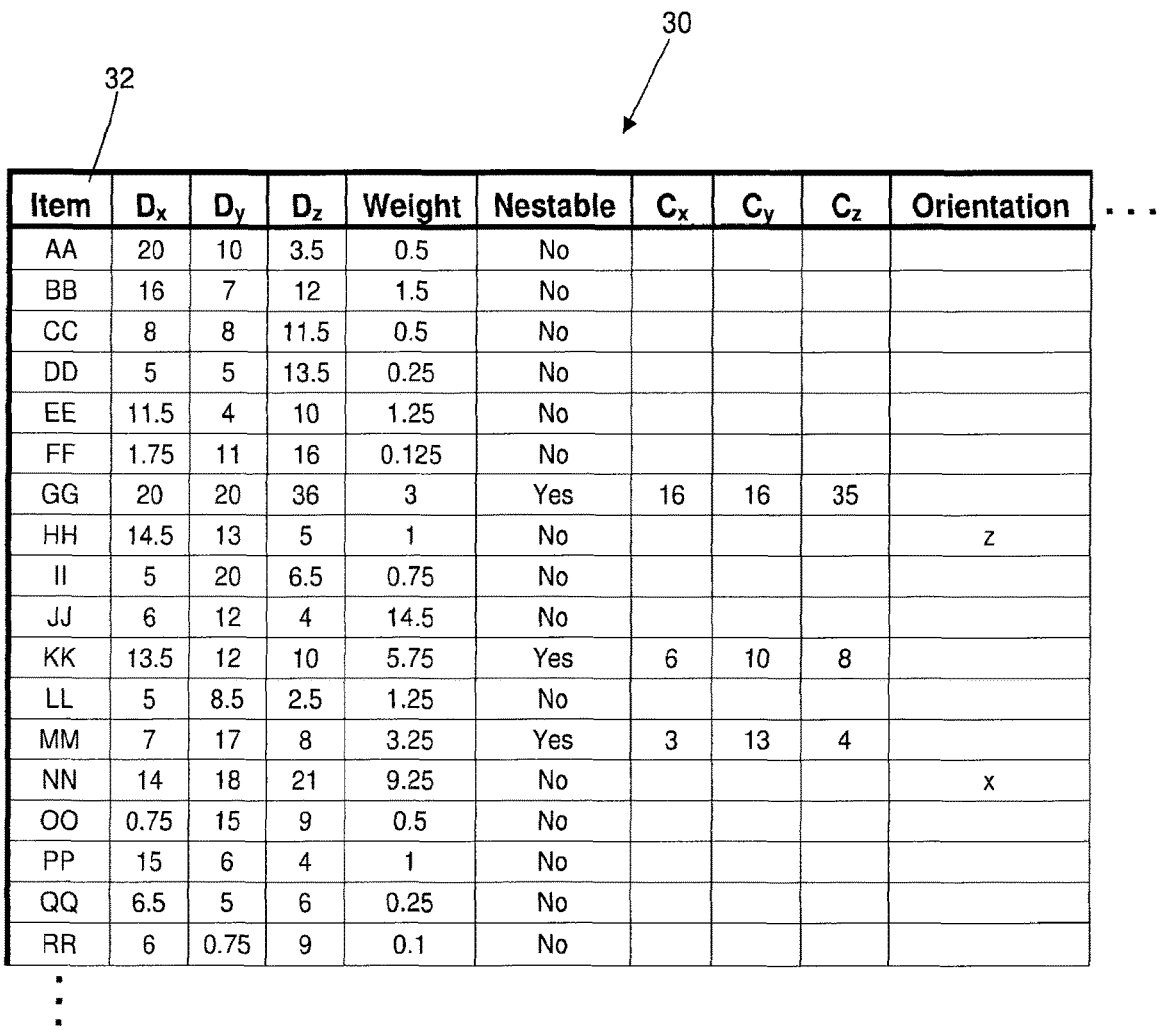
FIG. 2 illustrates a store of product dimension attribute information.

Turning now to FIG. 2, an example store of product dimensional attributes 16 is provided. In particular, FIG. 2 illustrates a table 30 into which various types of information about different items or products can be stored. In the example in FIG. 2, table 30 includes an item column 32 identifying each product for which dimensional attribute information has been collected. The information in item column 32 may in turn include some type of identification of each product. In the illustrated example, products AA-RR are shown; however, the vertical ellipses are provided to indicate that additional products may also be included.

Additionally, the type of information used to identify a product may vary. Such information may include, for example, a product name, product number, model number, SKU number, or any other unique identifier of an item. For each such item, different types of information may then be included that may be used by the packaging customization engine to virtually arrange the different items so that a packaging template can be produced. An arrangement may be virtual by, for example, producing a simulated model of the to-be-packaged items in a particular arrangement, so that when the items are physically collected, they can be arranged in a physical manner that corresponds to the simulated model.

Among other information, table 30 may include dimensional information about the footprint of the items to be included within the packaging. For example, the columns with the headings $D_x$, $D_y$, and $D_z$ may be used to denote the length, width, and height of the items. Using this information, the packaging customization engine can then create a virtual arrangement of all the products in an order to determine the overall dimensions of the information.

Other dimensional information beyond the mere rectilinear length, width, and height information may also be used. For example, in some embodiments, information about curves, irregularities, and/or other dimensions of the various items may be stored so that it can be accounted for as packaging customization engine 12 produces an optimal arrangement of items. In another embodiment, table 30 may store, or reference, three-dimensional models of the items to be packaged. As a result, packaging customization engine 12 may then access the product models and provide a virtual assembly using the models themselves to optimize the arrangement of items as discussed herein.

According to one embodiment, additional dimensional information includes whether or not the item is nestable. For example, footprint information about the length, width and height of an item may not itself convey whether or not other items may also fit within the same footprint of the nestable item. For example, consider a tubular container. Basic length, width, and height information does not include any information that the item is hollow, or the size of the hollow tube. By indicating that an item is nestable, however, table 30 can be used to more efficiently arrange items so that items can be nested inside each other. Moreover, nesting of items is not limited to hollow objects or objects with holes. For example, an irregularly shaped item may have an external cavity into which one or more other items may fit within the identified footprint for the irregularly shaped item.

To facilitate nesting of items, additional information about the available cavity can be included. The illustrated embodiment includes, for example, cavity length, width, and height information (i.e., $C_x$, $C_y$, and $C_z$ in table 30). By identifying the size of a nestable cavity or area of an item, packaging customization engine 12 may further optimize the arrangement of items to thereby reduce costs in at least packaging materials and handling costs associated with the entire package of multiple items.

In some embodiments, the weight of the items may also be provided in attribute table 30. Weight information may be used, for example, to provide packaging customization engine 12 with information it may use to separate items. For example, as discussed in greater detail herein, weight information may be used to optimize handling or shipping costs. Shipping costs may increase dramatically as overall weight of a package increases, so to optimize handling or shipping costs, packaging customization engine 12 may determine that the ordered items should be separated into two or more distinct packages, and then calculate the dimensions for each separate package.

In still other embodiments, table 30 may include orientation information about a particular item. For example, if a particular item should be oriented so that a particular direction faces upward, that direction may be specified in table 30. In particular, table 30 shows two items that have specific orientations. Product HH, for example, is indicated to require that the "z" direction be oriented in a particular manner, and information about product NN indicates that the "x" direction should be oriented in a specific manner. Additional information may further indicate what orientation is requested or required, or the orientation information in table 30 may be understood to have a particular meaning (e.g., the z-direction of product HH should be oriented vertically and/or the x-direction of product NN should be oriented vertically). The orientation information is, however, optional and may or may not be used in arranging items for customized packaging.

It should be appreciated that FIG. 2 is merely one example of a suitable store of product dimensional attribute information, and that table 30 may include a variety of other types of information. Indeed, as illustrated in FIG. 2, horizontal ellipses indicate that numerous other attributes may also be stored in table 30. Such attributes may relate to dimensional information or other attributes of associated items. For example, additional information may include information about curvatures or irregularities in a product, whether the product has multiple cavities into which other products can be nested, whether a cavity is an opening, a hollow center, an irregularity, etc., as well as other information such as pricing, inventory status, or order information. Additional information may indicate, for example, whether a product is flexible. A flexible product may be able to be placed in different configurations. For example, a shirt may be flexible and fit into a variety of different sizes and locations within a package. Further, if an item is flexible, fragile, or has other characteristics, the table may include information indicating that such item should not be used as the base for heavier items.

With reference now to FIG. 3, an exemplary purchase order 40 is illustrated in which a customer ABC, LLC of a vendor XYZ Corp. has placed an order for various products identified within table 30 of FIG. 2. In FIG. 3 it can be seen that twenty six items have been ordered, and that the twenty six items include twelve different types of items. Purchase order 40 of FIG. 3 is merely exemplary of any purchase order or other request that certain items be packaged together; however, the particular example in FIG. 3 will be used in more detail with regard to FIGS. 6A-6C to show manners in which items 42 in purchase order 40 can be arranged according to embodiments of the present invention.

Figure 4:
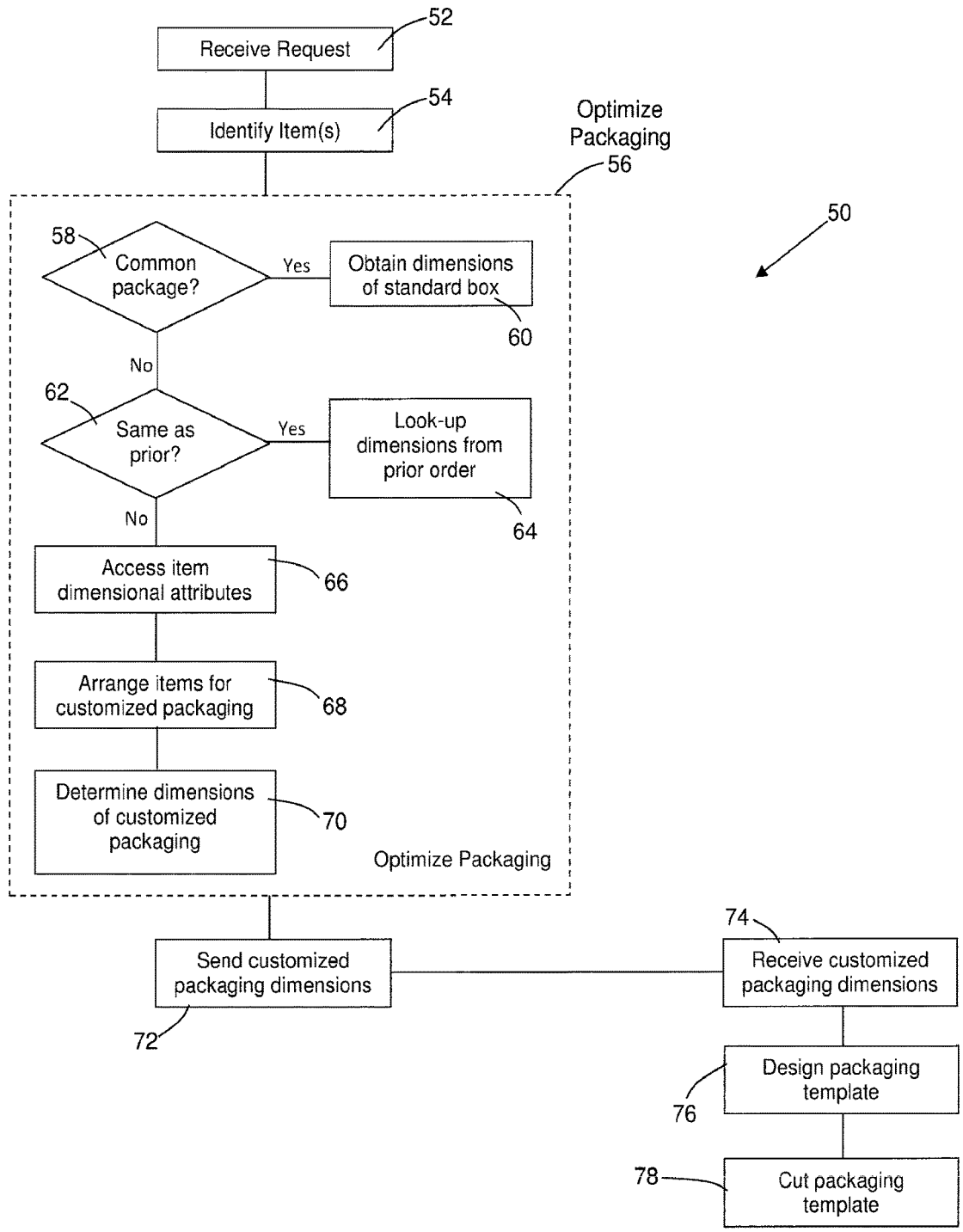
FIG. 4 illustrates a flow chart of a method of producing a customized package for an assortment of items.

Turning now to FIG. 4, an exemplary method 50 of producing customized packaging is provided. As depicted, method 50 can include various acts and steps (some optionally) performed by different components of an on-demand, customized packaging system. The acts and steps of method 50 will be described with respect to packaging customization engine 12 and packaging machine 20 of FIG. 1, although such acts and steps may alternatively or additionally be performed by other components or systems.

As depicted, method 50 includes an act of a packing customization engine receiving a request (act 52). For example, packaging customization engine 12 can receive a request 13 from order processing engine 22. The received request may, for example, request that packaging customization engine 12 prepare customized packaging for an order, shipment, or other collection of one or more items (e.g., purchase order 40 placed with order processing engine 22 through other applications 24). The request may identify such ordered items, or may provide information which packaging customization engine 12 may then use to identify the items for which customized packaging is desired.

Method 50 also includes an act of packaging customization engine identifying items (act 54). For example, as a result, and in response to receipt of request 13 from order processing engine 22, packaging customization engine 12 can identify the one or more items from purchase order 40 for which customized packaging is being requested.

Method 50 includes a step for optimizing packaging (step 56). Step 56 can include any corresponding acts for implementing the result of optimizing packaging. Step 56 can include optimizing packaging for a variety of different products (e.g., multiple products ordered on purchase order 40). Further, step 56 can be used to optimize packaging when no standard packaging or box is available or, as described hereafter, may optimize packaging by choosing a particular standard packaging or box for the identified items.

In one embodiment, step 56 includes an act of determining whether the collection of one or more items from the request is all or part of a common package (act 58). For example, after items are identified, packaging customization engine 12 may access product information 14 and identify common orders. Additionally, or alternatively, information about common orders may be stored in packaging customization engine 12, order processing engine 14, or in other suitable locations.

An order may be considered a common order where an order is for a single item and the vendor frequently sells that single item alone. Alternatively, an order for multiple different items, multiple quantities of the same item, or a combination thereof, may be commonly processed by the vendor, and thus also considered a common order. The frequency of a particular set of items in orders, or the number of orders that must be processed before an order is considered to be a common order is configurable, and will likely depend on the particular vendor, industry, products, and the like.

If at act 58 an order is determined to be a common order for which a standard box has been designed and/or provided, the dimensions for a standard package for the custom order may be obtained (act 60). For example, packaging customization engine 12 may access an internal store, or may access information store 14 or some other suitable location, and obtain the dimensions of the package customarily used for the common order.

If the determination at act 58 results in a determination that the items identified in act 54 are not part of a common order for which a standard box has been provided, method 50 may proceed to determine if a prior request has been made for the same collection of items (act 62). For example, packaging customization engine 12 may search for prior orders including an identical set of items. In one example, packaging customization engine 12 sends a query 15 to product information store 15 that searches prior orders of the same person or entity requesting the items identified in act 54. Other searches may additionally or alternatively be performed for prior orders or packaging requests. For example, query 15 may request that product information store 14 identify any order of identical items, or identically sized items, regardless of the entity requesting the items. If an identical prior order is located, a look-up of the dimensions of a customized package for such identical prior order may be performed (act 64). For example, packaging customization engine 12 may retrieve information through query 15 of information store 14 that identifies a prior identical order. In returning a response to query 15, information store 14 may also supply to packaging customization engine 12 dimensions of the packaging used for the prior order. Additionally, or alternatively, the response may also identify to packaging customization engine 12 a model arrangement of such items within the packaging of the identified dimensions.

Determining whether a prior request has been made for identical items (act 62) may also include, in some embodiments, determining whether the request is identical to an aggregate of two or more prior orders for which customized packaging had been created. For example, packaging customization engine 12 may send a query 15 to information store 14 (or alternatively to order processing engine 22) that identifies the requested items. If, for example, twelve of the twenty-six items from purchase order 40 in FIG. 3 had previously been ordered in a one order, and the remaining fourteen were ordered in a separate, second order, information store 14 or order processing engine 22 may send a response back to packaging customization engine 12 that identifies both such prior orders, and optionally also provide the dimensions for the two previously customized packages and/or model arrangements of such items for use with customized packaging.

Where the items identified in act 54 are not identical to any prior order, or optionally the aggregate of prior orders, it may be assumed that a new customized package is desired. A determination to create new customized packaging may be a default parameter when a negative response is received to the determination at act 62, however in other cases an administrator or user of system 10 may specifically request customized packaging. In any case, when new customized packaging is desired or needed, dimensional attributes of the items to be packaged may be accessed (act 66). For example, packaging customization engine 12 may send query 15 to product information store 14 for dimensional attributes of the items on purchase order 40. Information about such items may be stored in product dimension attributes 16 and may then be returned from product information store 14 to packaging customization engine 12. The specific dimensional attributes that are accessed may be varied and can include, for example, information about the size, shape, weight, orientation, and the like of each individual to-be-packaged item.

Once information about the dimensions of each item has been obtained in act 66, the to-be-packaged items may be arranged for packaging within customized packaging (act 68). Act 68 may include, for example, packaging customization engine 12 performing a simulation that virtually arranges the to-be-packaged items based on dimensional attributes retrieved in act 66. Such an arrangement may be purely virtual and does not require that the actual items be arranged, although in other embodiments, packaging customization engine 12 may access the to-be-packaged items, or models thereof, and use robotics or manual capabilities to physically arrange the to-be-packaged items. According to one example, packaging customization engine 12 may receive three-dimensional models of each of the to-be-packaged items from product information store 14 in response to query 15, and can use such three-dimensional models in performing a virtual arrangement of the items. Some example methods for arranging items for customized packaging (act 68) are described in greater detail with regard to FIGS. 5A-5C.

After a suitable arrangement of items has been produced in act 68, method 50 may proceed to determining the dimensions of the customized packaging (act 70). According to one example, packaging customization engine 12 uses the dimensional attributes obtained in act 66 and the model arrangement produced in act 68 to calculate the overall dimensions of the model arrangement, and thus also determines the dimensions needed for the customized packaging needed to contain the to-be-packaged items. The desired customized packaging can optionally have a generally rectangular configuration, and the arrangement of items in act 68 may accordingly optionally be optimized for such a rectangular configuration. Accordingly, determining the dimensions of customized packaging (act 70) may include packaging customization engine 12 calculating, measuring, computing, or otherwise identifying a length, width, and height of the interior of a customized package suitable to contain the arrangement of to-be-packaged items.

Once the dimensions of the customized package have been identified, either by an on-demand creation of a new customized package, or from a look-up of a previously used or standard-sized packaging template, the determined dimensions may then be sent to a packaging machine for production of the customized packaging (act 72), and the determined dimensions may be received by the packaging machine (act 74). For example, packaging customization engine 12 may calculate the maximum height, length, and width of the model arrangement of the items, and send such dimensions to packaging production machine 20. While the dimensions of the model arrangement may be sent in one example, in another example, the dimensions that are sent in act 72 may correspond to the dimensions of the customized packaging.

Upon receipt of the dimensions of the model arrangement, the packaging template may be designed (act 76). For example, a packaging production machine 20 may receive a message 19 from packaging customization engine 12, and message 19 may provide the dimensions of a customized and/or optimized model arrangement of items. After receipt of such a message 19, packaging production machine 20 may then automatically design a box template suitable to provide the desired dimensions. Such a box template may generally correspond to the dimensions received in message 19 but may optionally increase the size of the customized packaging to account for deviations in size of the to-be-ordered items, to allow for internal packaging materials to be inserted, to account for differences in internal vs. external dimensions of the customized packaging, or for other reasons.

Accordingly, in one embodiment, packaging production machine 20 may receive the packaging dimensions in act 74, and can then itself design the packaging template in act 76. Designing the packaging template in act 76, whether performed by packaging machine 20, packaging customization engine 12, or some other entity, may include looking-up a previously used template, or performing a new calculation for a template. For a new template, the new template may be designed automatically by packaging machine 20, such that the amount of corrugated cardboard or other material needed is automatically determined, along with the desired locations for cuts, creases, score lines, perforations, and other features that may facilitate assembly of the package from the template into a completed package suitable to receive and hold the items identified in act 54. Based on the template, the packaging template may be cut to provide a customized package specific to the identified items (act 78). For example, packaging machine 20 may feed packaging materials 26 and cut a template of the size and shape determined in act 76.

While method 50 has been described with regard to packaging machine 20 designing the packaging template (act 76), one skilled in the art will appreciate in view of the disclosure herein that such an act may alternatively be performed by other architecture components. For example, packaging customization engine 12 may optionally compute the dimensions of the model arrangement and also design the packaging template to be used to contain such arrangement. Then, instead of providing the packaging dimensions to packaging machine 20 in act 72, packaging customization engine 12 may instead provide the template design to packaging machine 20.

Designing the packaging template, whether performed by packaging machine 20, packaging customization engine 12, or some other entity, may include looking-up a previously used template, or performing a new calculation for a template. For a new template, the new template may be designed automatically by packaging machine 20, such that the amount of corrugated cardboard or other material needed is automatically determined, along with the desired locations for cuts, creases, score lines, perforations, and other features that may facilitate assembly of the package from the template into a completed package suitable to receive and hold the items arranged in the virtual/simulated model arrangement.

Any suitable manner for automatically designing the template may be used. According to one embodiment, packaging machine 20 may have access to packaging materials in the form of fanfold corrugated board. Such fanfold corrugated board may be accessible in a single size, or in multiple sizes. As such a design is being produced (e.g., by packaging machine 20 or packaging customization engine 12), the design itself may be optimized based on the available materials, to minimize use of the corrugated board given the fanfold material widths that are available. Thus, the system may determine the most optimal way to make the box to reduce the amount of corrugated board or other packaging materials that are used.

Other requirements or factors may also be considered. For example, a package may have a minimum size restriction. This may be for any number of reasons, including a restriction due to the need to place a shipping label on a panel of the package. Additionally, automated tape sealers and gluing devices may have size restrictions that are considered in optimizing the package size and design. For example, a tape sealer may only operate with packages of certain aspect ratios without jamming.

It will be appreciated in view of the disclosure herein that the method 50 provided herein may thus provide an automatic method by which an order or request of specific items may be received, and from which a box template or other packaging template specific to those orders can be automatically designed and produced without the need for human intervention. Indeed, method 50 may not only provide an automatic mechanism for producing the customized packaging, but it may also automatically determine an optimal or near-optimal manner for positioning the items in the customized packaging. Thereafter, the customized packaging may be assembled and then automatically or manually loaded with the identified to-be-packaged items. In the case of manually loading the customized packaging, packaging customization engine 12 or packaging machine 20 may optionally produce instructions, drawings, schematics, or other indicia to assist the person on the packing line in loading the items into the customized packaging in the same manner as designed based on the model arrangement.

In still other embodiments, however, some human or other manual intervention may be desired before a packaging template is designed and cut. For example, in one embodiment, there are different available model arrangements for the to-be-packaged items, and each possibility may have different advantages. In some embodiments, an operator of system 10 may therefore provide some input as to which option should be selected for the customized packaging. For example, packaging customization engine 12 may identify multiple possible arrangements and graphically, audibly, or otherwise provide information that an operator can use to view information about the different arrangements, or the packaging designs for each arrangement.

For example, packaging customization engine 12 may identify one model arrangement that provides a packaging template that minimizes the volume of the customized package, while another model arrangement minimizes the postage/shipping costs, and still another arrangement may minimize the amount of corrugated board or other packaging material 26 used in producing the template. While a determination of which model is desired may be made automatically, an alternative may include provide to a user details about each arrangement, including possibly the advantages and disadvantages of each. For example, packaging customization engine 12 may prompt an operator to select a desired design from multiple possible options.

Alternatively, rather than prompt the user for a desired design for a particular selection of items, the selection may be performed automatically based on predetermined settings or preferences. For example, an administrator or operator may specify that minimized area of the template, minimized volume, minimized shipping costs, minimized width dimensions, certain weight conditions, or other attributes should be given highest priority, and then a design may automatically be selected based on the predetermined setting. For example, packaging machine 20 or packaging customization engine 12 may automatically select a design based on such predetermined settings or preferences.

Figure 5A:
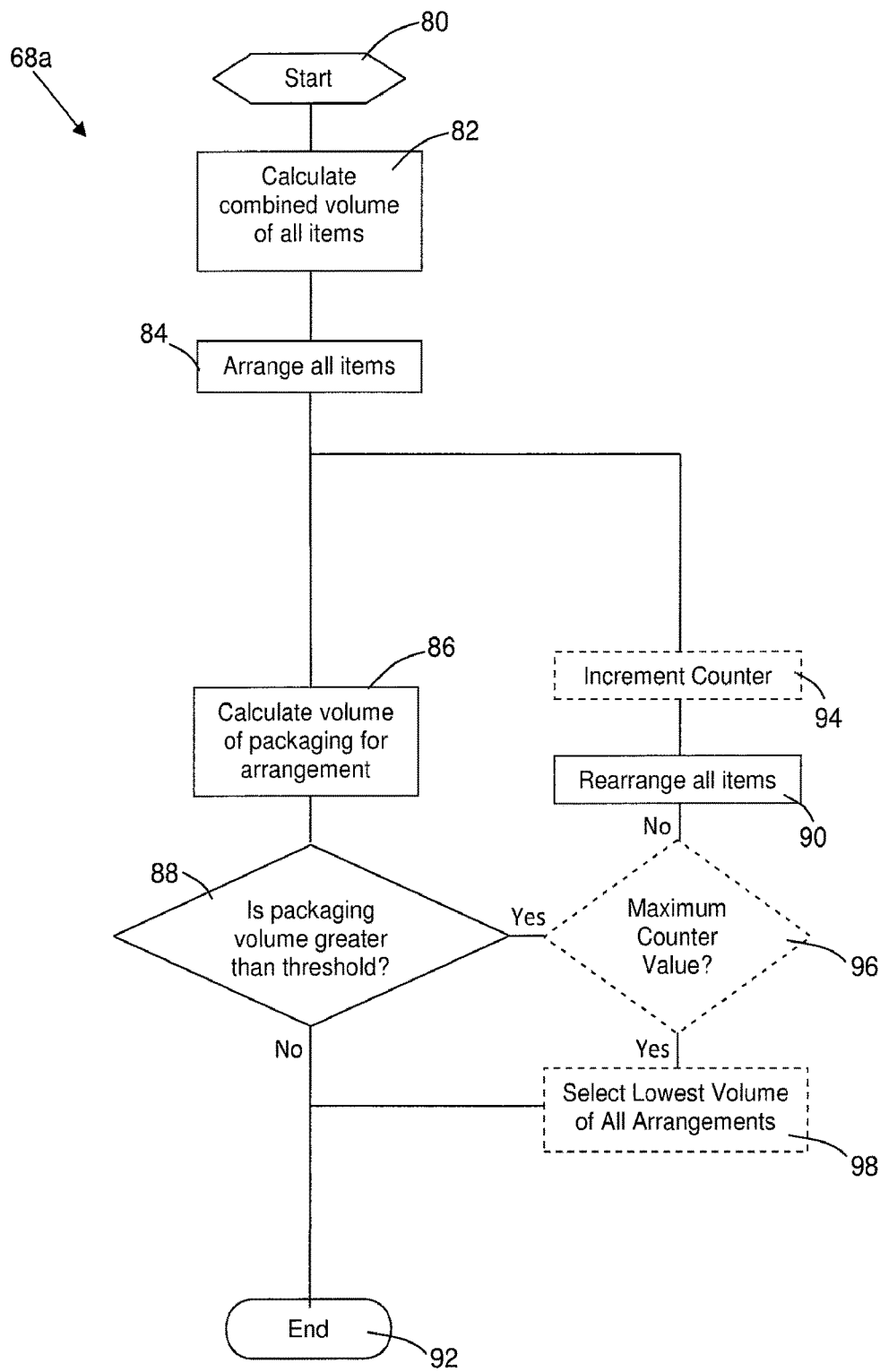
FIGS. 5A-5C illustrate example optimization procedures usable in the method of producing a customized package of FIG. 4.
Figure 5B:
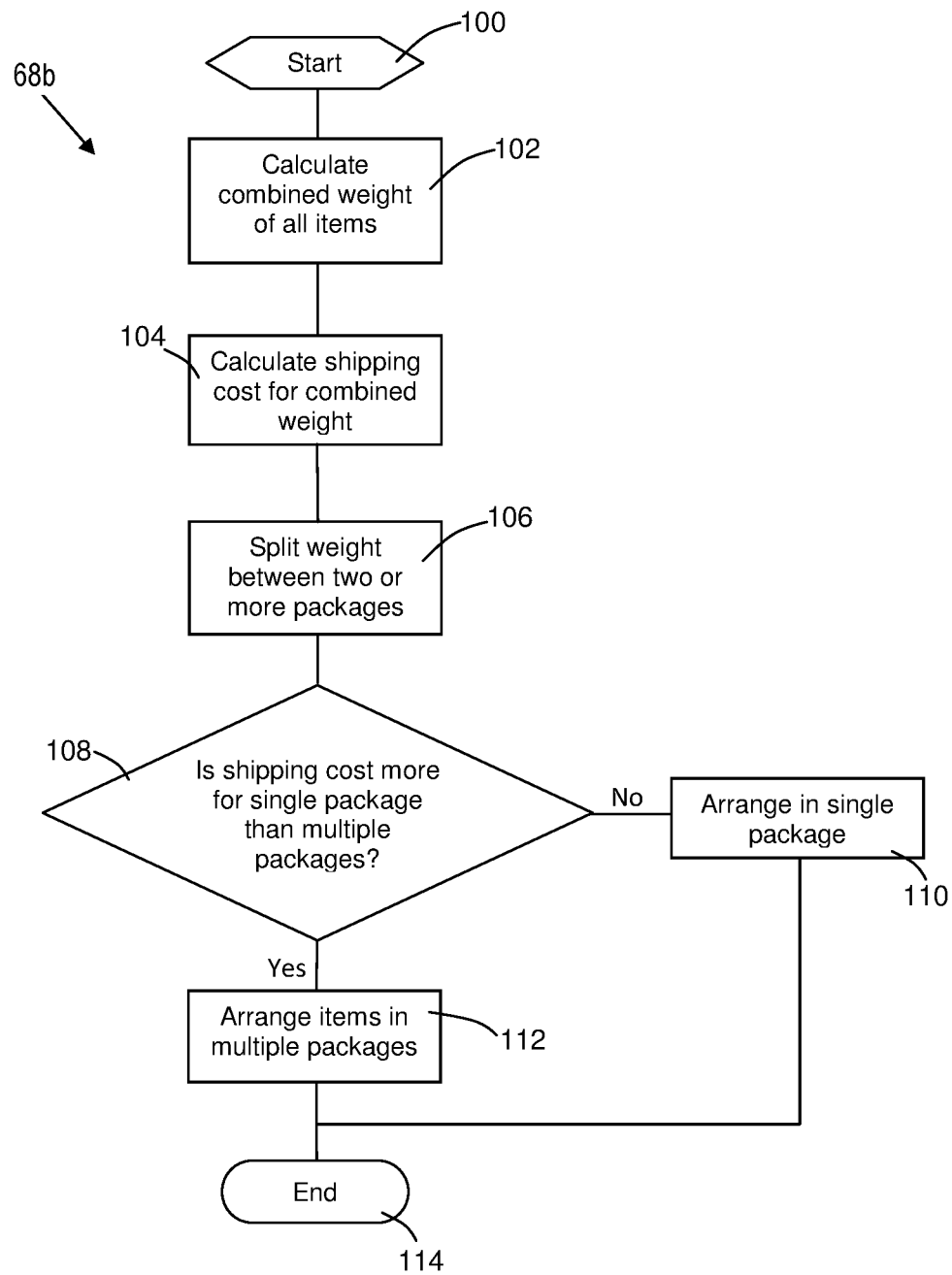
Figure 5C:
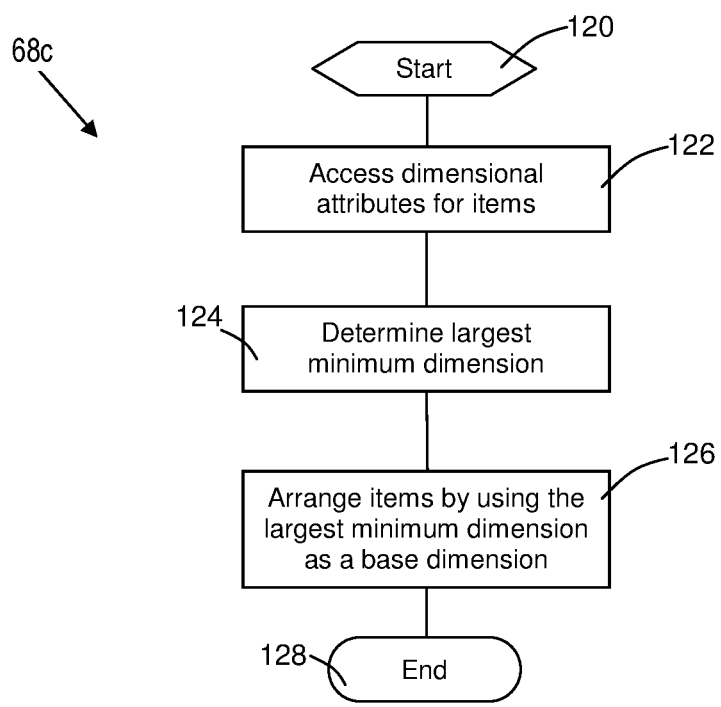

Turning now to FIG. 5A-5C, various example embodiments of methods for arranging items for customized packaging are described. It will be appreciated that methods 68a-68c are provided merely as examples of suitable methods for customizing and optimizing packaging according to various parameters, but that other parameters and optimization strategies are contemplated and within the scope of the present invention. Accordingly, no inference should be made that any element of methods 68a-68c are required or essential unless explicitly claimed.

FIG. 5A, for example provides a volumetric optimization arrangement method 68a that may be used for arranging items for act 68 of method 50 in FIG. 4. In method 68a, particular attention is given to the volume of the customized packaging for enclosing a particular arrangement of to-be-packaged items. In particular, method 68a starts (act 80) and the cumulative volume for all items is computed (act 82). With reference to the architecture in FIG. 1, computing the volume of items in act 82 may be performed by packaging customization engine 12, and can include calculating the volume of all to-be-packaged items individually, and then summing all such volumes. Where an included item may allow other items to be nested therewith, act 82 optionally includes excluding the volume of the cavity for the nestable item from the combined volume calculation.

Before, after, or concurrent with the calculation of the cumulative combined volume of all items in act 82, a possible model arrangement of the items may be produced (act 84). Such arrangement may be produced by packaging customization engine 12 in one example, and may be virtual as it is not necessary that packaging customization engine 12 physically arrange items, although in other embodiments, packaging customization engine 12 may physically arrange the to-be-packaged items. Regardless of whether the arrangement is performed virtually or physically, the length, width, and height dimensions for a package to capable of enclosing the particular arrangement may be identified, which also permit a volume for the packaging to be calculated (act 86). Thereafter, the volume of the packaging as determined in act 86 may be compared against the combined volume of the items as determined in act 82. For example, a determination may be made as to whether the packaging volume exceeds the combined volume by a threshold amount (act 88).

In one embodiment, the determination of act 88 is performed by packaging customization engine 12. Such a determination may be based on any suitable threshold (e.g., 5%). Thereafter, based on the compared volume of the customized packaging to the cumulative volume of the individual items, the to-be packaged items may be rearranged (act 90) or the method may end (act 92).

For example, in an embodiment in which the threshold is set to 5%, packaging customization engine 12 may determine whether the packaging volume exceeds the combined item volume by more than 5%. If the packaging volume exceeds such threshold, packaging customization engine 12 may also determine that a new model arrangement is desired for better or more optimal results, and the same items may be rearranged to have a new model arrangement in act 90. If the packaging volume is less than the threshold of 5%, packaging customization engine 12 may determine that the model arrangement is suitably optimal, and method 68*a* may end 92. Thereafter, a packaging template suitable for the model arrangement may be designed and/or produced. Method 68*a* thus provides, in one embodiment, an iterative approach to arranging the to-be-packaged items. In particular, method 68*a* may allow multiple arrangements to be calculated and compared to a desired parameter (e.g., the volume of the items vs. volume of the model arrangement) and when a suitable volume is obtained, method may terminate.

The threshold of 5% as provided in the example above is merely exemplary, and the particular threshold that is used, if any, may be user-configurable by an administrator or operator, can vary based on the volume of the package, or vary based on a number of other criteria. For example, the threshold may be less than 5% (e.g., between about 2% and 5%) or be greater than 5% (between about 5% and about 20%). In other embodiments, the threshold varies directly with the volume, such that the greater the combined volume of all items, the larger the threshold value.

While method 68*a* arranges and re-arranges to-be-packaged items based on a volume calculation and terminates as soon as a suitable volume below the threshold is found, this is also exemplary only. In some embodiments, for example, it may be impossible or impractical to produce an arrangement resulting in a packaging volume below a particular threshold level. In such cases, method 68*a* optionally includes using a counter, and each time a new arrangement of items is produced in act 90, the counter may be incremented (act 94). For example, packaging customization engine 12 may include an internal counter that it increments with each arrangement and/or rearrangement of the to-be packaged items.

Optionally, method 68 also evaluates the number of arrangements produced after each volume comparison is made in act 88. For example after a packaging volume is determined to exceed the threshold, the counter may be evaluated to determine whether the counter has reached a maximum counter value (act 96). If the maximum counter value has not been reached, method 68*a* may proceed to again rearrange the items in act 90. If, however, the determination of act 96 determines that the maximum counter value has been reached, method 68*a* may instead proceed and a review of the necessary packaging volume from each arrangement of items in acts 84 and 90 can be performed, with a selection being made of the arrangement having the lowest volume (act 98). For example, packaging customization engine 12 may at least temporarily store information about each model arrangement produced and, at act 98, can compare volume information for each model arrangement to determine which model arrangement has the lowest volume. The lowest-volume arrangement may then be selected and the dimensions thereof used to design and cut a suitable packaging template.

Further, it should be appreciated in view of the disclosure herein that it is also not therefore necessary to compare the packaging volume against a combined volume of all items, and that method 68*a* is exemplary only. Instead, multiple arrangements of the to-be-packaged items may be produced, and the arrangement with the lowest volume may be selected (without the need to compare the volumes against the aggregate volume of the to-be-packaged items). The number of arrangements and rearrangements that are produced and compared can be set to a predetermined number (e.g., by incrementing the counter), may be limited based on time (e.g., compute as many possible arrangements produced in one minute), or can be limited or configured in other manners.

Turning now to FIG. 5B, another exemplary embodiment of a method for arranging items for a customized package is described (method 68*b*). In particular, FIG. 5B illustrates an exemplary method 68*b* that particularly identifies the cost of the customized package in terms of shipping, postage, and/or other handling charges, and produces an arrangement that minimizes such costs.

Specifically, method 68*b* begins (act 100) and the weight of all to-be-packaged items is calculated (act 102). For example, packaging customization engine 12 may send a query 15 to access product dimension attributes 16 in product information store 14, and receive a request that includes information about the unpackaged weight of such items. Costs associated with shipping an item may also be accessed and/or (e.g., by packaging customization engine 12 accessing a store of shipping terms and costs in product information store 14 or in or through other applications 24). The shipping, handling, and/or postage costs associated with the to-be-packaged items may depend, at least in part, on the combined weight of the to-be-packaged items. To determine whether the weight can be optimized for shipping costs, the total weight may be split between two or more packages (act 106). The total weight may be split in act 106 by, for example, using product weight information in the product sales information 18 and/or product dimension attributes 16 of information store 14, and separating specific items to produce desired weights. For example, packaging customization engine 12 may obtain information about the weights of the to-be-packaged items through query 15 and then split the weight evenly between two or more packages. Alternatively, packaging customization engine 12 may assign weights in other proportions (e.g., select a weight based on a maximum weight-to-cost ratio).

Based on the particular combination of items, each of which may produce different weights for a particular package, the shipping cost for the single package may be compared against the combined cost for shipping multiple packages of reduced weights (act 108). If the single package is no more expensive than the multiple packages, method 68*b* proceeds to arrange the items in a single package (act 110). However, if arranging the items into multiple packages can reduce the shipping costs as determined in act 108, the items may then be arranged into multiple packages (act 112). After arrangement of the items into a single package (act 110) or multiple packages (act 108), method 68*b* may end (act 114). After a particular model arrangement of one or more separate packages is produced and method 68*b* ends, the information about such model arrangement may be used to produce one or more packaging templates to enclose such arrangements.

As with method 68*a* of FIG. 5A, method 68*b* in FIG. 5B is also capable of being performed iteratively. For example, in act 106, the total weight of the to-be-packaged items may be split in various different proportions, and the shipping costs associated with each such combination may be calculated. Thereafter, at act 108, a determination may be made as to which combination provides the lowest shipping costs, and an arrangement or rearrangement can then be made by separating the items in a manner that provides the desired weights.

Furthermore, it will readily be appreciated that shipping, handling, and postage costs may be influenced by other factors other than weight. For example, the dimensions of a customized package may also influence the shipping, handling, postage, or other cost. Accordingly, method 68b may be readily adapted by one skilled in the art in view of the disclosure herein to include additional considerations. For example, an iterative process may be implemented that not only separates items into different weights, but also performs an arrangement prior to act 108 that determines shipping costs associated with a single package and multiple packages. Thus, method 68b may be optimized to provide reduced postage based on weight, physical dimensions, and/or other factors.

Turning now to FIG. 5C, another example embodiment for arranging items for customized packaging is described. In particular, the method 68c in FIG. 5C specifically arranges items based on a largest minimum dimension, although other considerations may also be evaluated.

Method 68c starts (act 120) and dimensional attributes for one or more to-be-packaged items can be accessed (act 122). For example, packaging customization engine 12 may query product information store 14 and obtain dimensional information from one or more files that describe product dimension attributes 16. Regardless of the manner of accessing the dimensional attributes, a largest minimum dimension may be determined (act 124). For example, referring to table 30 in FIG. 2, packaging customization engine 12 may receive information from product information store 14 that identifies item GG as having the largest minimum dimension. For example, packaging customization engine 12 may iterate over table 30 and determine that the smallest dimension of item GG is twenty, while every other listed item in table 30 has at least one smaller dimension. In another example, the items in purchase order 40 of FIG. 3 may be identified and packaging customization engine 12 may obtain product dimension attributes 12 for each such item. In this example, item GG may not have been ordered, and packaging customization engine 12 may determine that KK has a minimum dimension of ten, which is larger than the minimum dimension of any other item ordered using purchase order 40.

The largest minimum dimension may represent the smallest possible dimension for a customized package that encloses all of the to-be-packaged items in a single package. In one embodiment, arrangement method 68c may then use the largest minimum dimension as determined in act 124 as it arranges the to-be-packaged items using the largest minimum dimension as a base dimension (act 126). For example, packaging customization engine 12 may simulate an arrangement of the to-be-packaged items by setting the largest minimum dimension as an overall width of the customized packaging, and fixing the width dimension so that the width of the simulated model arrangement does not exceed the largest minimum dimension. Thereafter, the items may be placed on, around, or within the object having the largest minimum dimension, so long as at that dimension (e.g., the width) is not increased. For example, packaging customization engine 12 may place the item with the largest minimum dimension and then position other items relative to such item. When all objects have been arranged in such a manner, method 68c may end (act 128).

It should be readily apparent in view of the disclosure herein that method 68c may be adapted and modified in any number of ways. For example, method 68c can be an iterative process in which multiple arrangements are made, and one of the arrangements is ultimately selected based on some other criteria (e.g., handling costs, volume, area, weight, etc.). In addition, the largest minimum dimension may itself provide a starting point for a base dimension. By way of example, various tolerances may be applied to increase the largest minimum dimension enough to allow items to be easily and efficiently placed within the customized packaging. Additionally, or alternatively, some other algorithm or calculations may be performed to select and arrange items relative to the item(s) identified as having the largest minimum dimension. Furthermore, multiple largest minimum dimensions may be calculated. For example, if the to-be-packaged items are separated into multiple packages, each of the multiple packages may have a largest minimum dimension associated therewith.

The specific manner of arranging and optionally rearranging the to-be-packaged items (e.g., in methods 50 and 68a-68c) may thus be varied and performed in any number of ways. In one embodiment, for example, an item may be selected randomly, or pseudo-randomly. Thereafter, another item may be selected and placed on, around, or within the last-selected item, and this process may continue for each item. The progressive selection of items may also be random or pseudo-random, although in other embodiments items are selected based at least in part on their dimensions so that items can collectively form an arrangement that is generally rectilinear in form. Selection of items may itself also be an iterative process, and an item may be moved numerous times before an arrangement or rearrangement of all items is completed.

In some cases, the actual arrangement of items may occur by matching the particular dimensions of multiple items (e.g., width with width, length with length, etc.) in a generally two-dimensional fashion, such that items are generally arranged side-to-side or end-to-end. The methods described herein are not, however so limited. For example, packaging customization engine 12 may receive three-dimensional attribute information from product information store 14, and can then virtually or physically manipulate to-be-packaged items in three-dimensions. For example, packaging customization engine 12 may rotate items relative to each other, space items vertically or horizontally to each other, place items next to, within, or stacked on each other, or otherwise arranged to produce a three-dimensional arrangement. Additionally, as customized packaging may be created that is generally rectilinear in form, arrangement of the items may take into consideration other aspects such as, for example, placement of items next to corners and/or edges to strength and secure such edges or corners from damage, thereby acting to preserve the integrity of the customized packaging.

While various arrangement strategies have been described herein, the illustrative methods (e.g., methods 50 and 68a-68c) may also be combined together and/or replaced with still other arrangement methods. For example, in one embodiment, a method for arranging items may produce different arrangements using an iterative process, and then can evaluate all calculated arrangements based on the minimum amount of corrugated board or other packaging material needed. Such a consideration may be of particular concern to certain entities that do not provide a capital investment for a packaging machine, but instead pay for use of such a machine based on the square footage of the corrugated board used. In still other embodiments, area, volume, postage/shipping, and other considerations are collectively considered (e.g., with different weight values) to automatically determine which arrangement to use in producing the customized packaging.

Figure 6A:
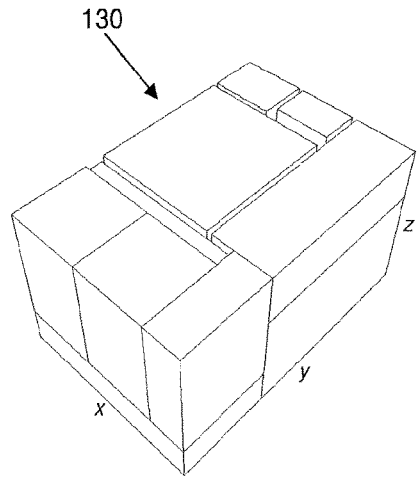
FIGS. 6A-6C illustrate example product configurations identified in the optimization methods of FIGS. 5A-5C.
Figure 6C:
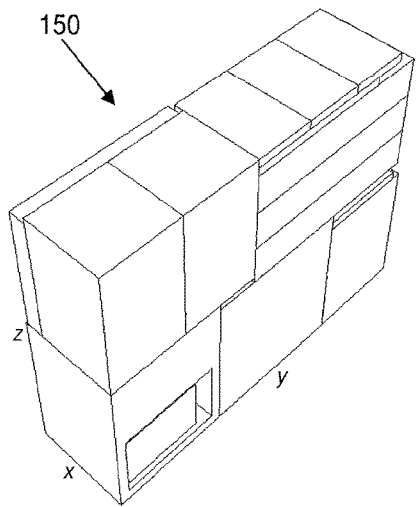
Figure 6B:
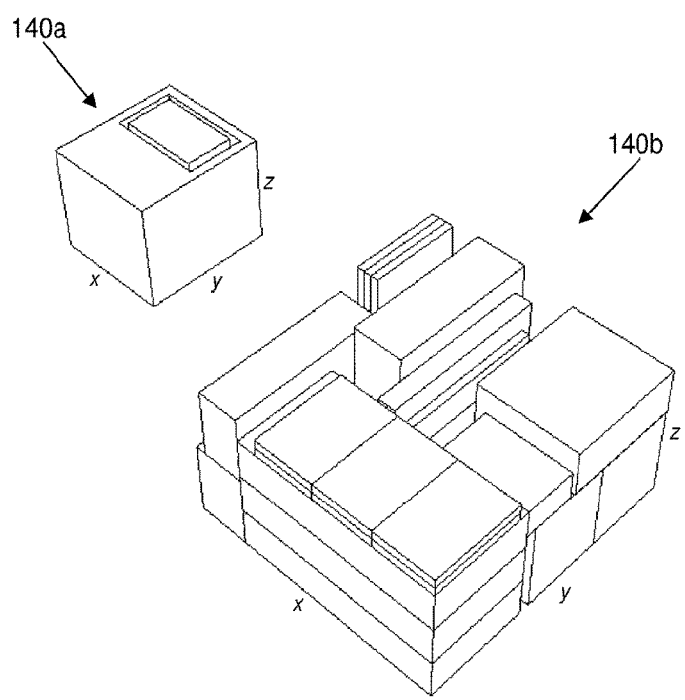

Turning now to FIGS. 6A-6C, various example embodiments of arrangements that can be produced in accordance with the present invention are illustrated. In particular, FIGS. 6A-6C are illustrative of various example arrangements of items corresponding to purchase order 40 of FIG. 3, and with the dimensions in table 30 of FIG. 2.

FIG. 6A, for example, illustrates a model arrangement 130 of the items, and quantities of such items, identified on purchase order 40. Twenty-six total items are included in model arrangement 130, and the particular arrangement can be seen to have a generally rectilinear configuration. In one embodiment, the illustrated arrangement 130 is produced by arranging the items according to method 68a which optimizes arrangement 130 based on volume of arrangement 130 as compared to the total volume of the to-be-packaged items, the volume of other considered arrangements, or both.

As shown in FIG. 6A, arrangement 130 is generally rectilinear and has length (x), width (y), and height (z) dimensions. Based on the dimensional attributes in table 30 of FIG. 2, arrangement 130 may have approximately the dimensions identified below in Table 1.

FIG. 6B illustrates another example arrangement of the twenty-six items ordered using purchase order 40 of FIG. 3. In this arrangement, the to-be-packaged items have been separated into two separate model arrangements 140a, 140b. According to one example, model arrangements 140a, 140b have been selected by using a packaging customization engine 12 that performs method 68b. For example, packaging customization engine 12 may select which items are included in each of model arrangements 140a, 140b and also perform the virtual arrangement thereof, based on a constraint that desires to reduce costs associated with shipping and handling a collection of items.

FIG. 6C illustrates still another example arrangement 150 of the items ordered using purchase order 40 of FIG. 3. As will be appreciated by comparing arrangement 150 to arrangements 130, 140a, and 140b, arrangement 150 may include the same collection of items, but have dimensions that are significantly different than those of other arrangements that may be produced or considered. For example, using one or more arrangement methods, packaging customization engine 12 may produce each of arrangements 130, 140a, 140b and 150, and each have significantly different overall dimensional attributes, despite the consistent dimensional attributes of the individual to-be-packaged items. According to one embodiment, model arrangement 150 may be produced by using method 68a or method 68b, although in another embodiment, arrangement 150 is produced by considering the largest minimum dimension according to method 68c of FIG. 5C.

Figure 7C:
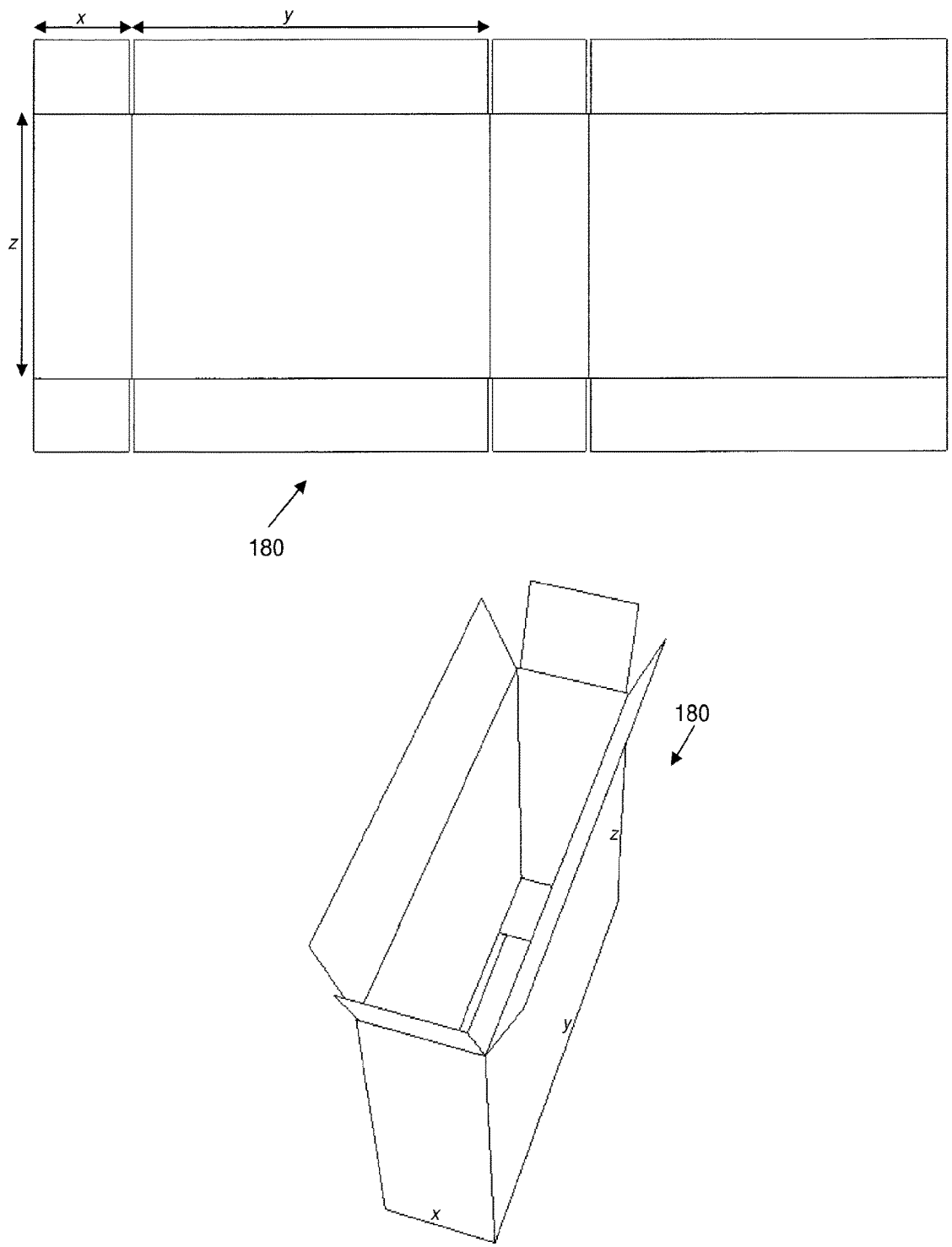

FIGS. 7A-7C illustrate various packaging templates 160, 170a, 170b, and 170c that may be produced by packaging machine 20 as customized templates for the particular set of items identified in purchase order 40. FIG. 7A, for example, illustrates a packaging template 160 as it is produced by packaging production machine 20, as well as an assembled configuration thereof. As produced, template 160 may be produced from corrugated board or other packaging materials and have creases and/or cuts automatically created to facilitate folding and assembly of package 160 by packaging machine 20. To illustrate one manner of folding a template 160 into an assembled configuration, FIG. 7A illustrates each panel A-L on a template and corresponding locations of such panels as visible in the folded and assembled configuration.

The template 160 may be produced by the packaging machine 20 and can be sized to have approximately the same dimensions as a particular arrangement of items for which the template has been customized (e.g., items ordered on purchase order 40). Packaging template 160, for example, includes length (x), width (y), and height (z) dimensions that generally correspond to the same dimensions of arrangement 130 illustrated in FIG. 6A. Similarly, templates 170a and 170b have length (x), width (y), and height (z) dimensions that generally correspond to the same dimensions of arrangements 140a, 140b, respectively, illustrated in FIG. 6B. FIG. 7C illustrates a customized packaging template 180 generally corresponding to the specific arrangement 180 of items illustrated in FIG. 6C.

Table 1 provides various exemplary details regarding the dimensional aspects of arrangements 130, 140a, 140b, and 150, and some corresponding characteristics of packaging templates 160, 170a, 170b, and 180 to more clearly illustrate various comparisons and considerations that can be made in selecting a particular arrangement of items.

TABLE 1

| Arrangement/Packaging | $D_x$ (in) | $D_y$ (in) | $D_z$ (in) | Surface Area (ft$^2$) | Volume (ft$^3$) | Weight (lb) |
|---|---|---|---|---|---|---|
| 130/160 | 20 | 30 | 15 | 27.1 | 5.21 | 19 |
| 140a/170a | 12 | 13.5 | 10 | 9.2 | 0.94 | 9.5 |
| 140b/170b | 25 | 27 | 13 | 31.1 | 5.08 | 9.5 |
| 150/180 | 10 | 37 | 25 | 25.5 | 5.35 | 19 |

As will be appreciated from a review of Table 1 in view of the disclosure herein, each identified arrangement may include various advantages that may make it desirable over other arrangements. Further, while three basic arrangements are illustrated, this is merely to avoid unnecessarily obscuring the invention, and many different arrangements may be produced and compared.

With regard to the attributes of the item arrangements identified in Table 1, it can readily be seen that arrangement 130 may be selected instead of arrangements 140a, 140b and 150 (e.g., by packaging customization engine 12), particularly if a constraint considered is the desire to minimize volume of a package. Specifically, the volume of arrangement 130 is less than the volume of the same items in the arrangement of items in arrangement 150, and significantly less than the combined volume of arrangements 140a, 140b necessary to contain the same items.

Total volume may be considered where, for example, it is desirable to minimize the amount of empty space within a customized package. Reducing the empty space in a package can reduce the amount of shifting or play between the contained items, and may provide a more precise fit than other alternatives. This may be significant as the shifting of items may cause damage to the items themselves, or to the packaging itself, which could lead to damage of other items. Further, by reducing the amount of empty space, the need for internal packaging materials can be reduced or eliminated.

Minimizing the volume of the packaging may not, however, always translate into minimized cost, or may not always be desired for other reasons. For example, as shown in Table 1, the overall weight of arrangement 130 may be about nineteen pounds. Based on shipping, handling, and/or postage rates, the cost to send a nineteen pound package may possibly exceed the cost of sending two lighter packages that contain the same items. Accordingly, based on postage rates, a vendor or manufacturer may prefer an arrangement such as arrangements 140a, 140b in which the items are distributed between two packages of half the weight. The weight need not, however, be evenly distributed. Accordingly, in one example, packaging customization engine 12 evaluates each of arrangements 130, 140a, 140b, and 150 and may choose arrangements 140a, 140b based on a desire to reduce handling costs. Such selection may be automatic or may be based in some part on prompting or selection from a user.

Costs may, in some circumstances, also be reduced by customizing packaging for arrangement 150 over any of arrangements 130, 140a, and/or 140b. For example, many vendors or manufacturers may use packaging machines to produce customized packaging but prefer to avoid the capital expenditure necessary to purchase such a machine. In such cases, companies specializing in packaging equipment may instead provide equipment to a vendor or manufacture and charges for use of the equipment may be based on the amount of corrugated board or other packaging material used to produce package templates. In such a case, a vendor, manufacturer, or other person or entity that packages items may experience a dramatic cost savings by reducing the amount of material used to produce the packaging materials itself.

Where the amount of packaging materials used is a primary concern, such a person or entity may associate a weight value with the surface area of the packaging itself as the only relevant constraint, or possibly higher than other constraints that are also considered. In such a case, arrangement 150 may be preferred as it provides approximately a six percent savings over the amount of material used for packaging of arrangement 130, and a approximately a thirty-seven percent savings over the amount of material used for packaging arrangements 140a, 140b.

Selection of any such arrangement of items, and the corresponding customized packaging, may thus be based on the identified criteria or any other desired criteria, and cost need not always be considered in selecting a particular arrangement for use with customized packaging. Furthermore, in some embodiments, selection of a particular arrangement is performed automatically, such that from the time a set of items are received to the time an arrangement of items is identified and/or selected, no human or manual intervention is necessary to determine which arrangement to use, or which packaging template to produce. In other embodiments, however, selection of an arrangement may be input manually (e.g., by an operator of a customized packaging system). For example, various arrangements and/or characteristics of the arrangements and customized packaging may be displayed or otherwise provided to an operator, to allow the operator to choose which arrangement is preferred.

While the foregoing discussion relates to customization of a box for a particular order or other collection of items, it should be appreciated that the described methods may also be readily adapted for other uses. For example, according to one embodiment, packaging customization engine may not be connected to a packaging production machine. Instead, a vendor, manufacturer or other person or entity that wishes to package a collection of one or more items may provide such information. When information about the objects is received at the packaging customization engine, it may access the information store, arrange the items and/or obtain the dimensions of the arrangement. Thereafter, instead of creating a packaging template or sending the dimensions to a packaging production machine, the packaging customization engine may instead access information about different sized boxes that are already available.

As will be appreciated in view of the disclosure herein, many different sizes of standard boxes may be available. If items are selected and placed manually, the person manually placing the items may select a box that is too small, and thereby waste effort trying to get the items to fit within a particular box. The person may also select an appropriately sized box; however, the person may spend valuable time trying to figure out a way to fit all items into the box. Because of the time that may be wasted by selecting too small a box or even an appropriately sized box, the person may instead intentionally, or even unintentionally, select a box that is larger—and in some cases much larger—than is needed for the items. The use of a larger box can reduce the time needed to pack the items in the box, but may increase the postage costs, the materials cost of the box itself, the cost of internal packaging materials, and the risk of damage and loss to the contained items.

Accordingly, while one embodiment of the invention is related to cutting a package specifically customized to particular items, another embodiment relates to identifying which of a variety of already available boxes is most appropriate for a collection of items. The box can be identified by the packaging customization engine, and a template of the model arrangement of items may also be provided so as to allow efficient packing of the box or other package.

The discussion herein refers to a number of methods and method steps and acts that may be performed. It should be noted, that although the method steps and acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media, including at least computer storage media and transmission media.

Examples of computer storage media include RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules, engines, and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above, nor performance of the described acts or steps by the components described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed computing environment, program modules may be located in both local and remote memory storage devices.

Those skilled in the art will also appreciate that the invention may be practiced in special-purpose or other computing devices integrated within or coupled to packaging machines, whether by a network connection, wireless connection, or hardwire connection. Exemplary packaging machines may include machines that cut or crease packaging materials to form packaging templates. Example packaging machines suitable for use with embodiments of the present invention may also directly, or indirectly, execute program code that enables the packaging machine to accept dimensional inputs and design a customized packaging template based on the input. Such input may be provided manually or, as described herein, may be provided by a packaging customization engine that, for example, automatically determines the dimensions necessary. In some embodiments, the packaging customization engine may also be incorporated within the packaging machine that cuts customized packaging templates, while in other embodiments it is separate from the packaging machine and communicatively coupled thereto.

Although the foregoing invention has been described in some detail by way of illustration and example, for purposes of clarity and understanding, certain changes and modifications will be obvious to those with skill in the art in view of the disclosure herein. The described embodiments are to be considered in all respects only as illustrative and not restrictive. For example, the frame structures described herein as acting as an anchoring structure and may take a variety of forms, including articulated linkages, expandable balloons, multiple layer coils, and the like. Thus, all changes which come within the meaning and range of equivalency of the claims are to be embraced within their scope.

We claim:

1. A computer implemented method for creating customized packaging for a plurality of items on-demand, the method comprising:
   receiving over a network connection a request for customized packaging for a plurality of items, the request identifying the plurality of items to be included within a package;
      in response to receiving the request, accessing an informational store within a database, and retrieving:
      three-dimensional models of each item in the plurality of items, and
      an indication that a first item in the plurality of items is nestable;
   virtually arranging said three-dimensional models into a plurality of distinct virtual model arrangements, one of said plurality of distinct virtual model arrangements comprising an optimized virtual model arrangement, wherein the optimized model arrangement comprises a second item selected from the plurality of items nested within the first item of the plurality of items;
   calculating dimensions of said optimized virtual model arrangement useable to produce a customized package template sized particularly for said plurality of items when said plurality of items are arranged and positioned consistent with said optimized virtual model arrangement; and
   automatically designing a customized packaging template based on the calculated dimensions of said optimized virtual model arrangement;
   and transmit said customized package template to a packaging production machine which in response creates a box template sized to house the plurality of items when the plurality of items are physically positioned in a manner corresponding to the optimized virtual model arrangement.

2. A method as recited in claim 1 further comprising calculating dimensions of each of said plurality of distinct virtual model arrangements and selecting from among said plurality of distinct virtual model arrangements the optimized virtual model arrangement based on said calculated dimensions.

3. A method as recited in claim 1, further comprising producing a customized package template sized particularly for said plurality of items when said plurality of items are arranged and positioned consistent with said optimized virtual model arrangement.

4. A method as recited in claim 1, further comprising:
sending said calculated dimensions to a packaging production machine for said packaging production machine to create a packaging template based on said calculated dimensions of said optimized virtual model arrangement.

5. A method as recited in claim 1, further comprising determining which one of said plurality of distinct virtual model arrangements comprises an optimized virtual model arrangement by evaluating said plurality of distinct virtual model arrangements using one or more of:
volume of said plurality of items;
volume of said plurality of model arrangements;
surface area of said customized packaging;
postage, shipping or handling costs; or
largest minimum dimension.

6. A method as recited in claim 1, wherein virtually arranging said plurality of items into a plurality of virtual model arrangements includes:
producing a plurality of virtual model arrangements;
selecting a particular virtual model arrangement; and
calculating the dimensions of the particular virtual model arrangement.

7. A method as recited in claim 1, wherein the indication that first item in the plurality of items is nestable comprises one or more dimensions describing a cavity of the first item, wherein the second item is nestable within the cavity.

8. One or more computer-readable storage media having stored thereon computer-executable instructions that, when executed by a processor, cause a computing system to perform the method of claim 1.

9. A packaging machine equipped to perform the method of claim 1, or in communication with a customization engine performing the method of claim 1, the packaging machine further being configured to produce a packaging template corresponding to the dimensions calculated for said model optimized virtual model arrangement.

10. A system for on-demand creation and customization of packaging, comprising:
one or more computer-storage media having stored thereon an information store that includes dimensional attributes for multiple different items; and
a packaging customization engine communicatively coupled with said information store, said packaging customization engine being configured to:
receive a request for customized packaging for a plurality of items, each of said plurality of items being identified in said information store;
access said information store and retrieve said dimensional attributes for each of said plurality of items, wherein the dimensional attributes include:
three-dimensional models for each of the plurality of items, and
an indication that a first item in the plurality of items is nestable;
use said three-dimensional models to virtually develop an optimized model arrangement of all of said plurality of items, wherein the optimized model arrangement comprises a second item selected from the plurality of items nested within the first item of the plurality of items;
calculate overall dimensions of said optimized model arrangement; and
automatically design a customized package template based on said overall dimensions of said optimized model arrangement;
and transmit said customized package template to a packaging production machine which in response creates a box template sized to house the plurality of items when the plurality of items are physically positioned in a manner corresponding to the optimized virtual model arrangement.

11. The system of claim 10, further comprising a packaging production machine communicatively coupled with said packaging customization engine and operable to create packaging templates from corrugated board based on said customized packaging template or the overall dimensions of said optimized model arrangement.

12. The system of claim 10, wherein using said three-dimensional models to virtually develop an optimized model arrangement includes using three-dimensional information from said information store in developing a plurality of three-dimensional model arrangements and selecting from among said plurality of virtual model arrangements the optimized virtual model arrangement based on overall dimensions of said plurality of virtual model arrangements.

13. An on-demand box design and production system that automatically creates customized boxes for any collection of items, the system comprising:
one or more processors;
at least one computer-readable storage medium providing an information store of dimensional attributes for different items, the dimensional attributes including three-dimensional size information about the different items;
a packaging customization engine executable by the one or more processors to:
receive a request that a plurality of items be boxed together, each of said plurality of items having corresponding dimensional information stored in said information store;
access said information store and retrieve:
three-dimensional models for each of said plurality of items, and
an indication that a first item in the plurality of items is nestable;
use said three-dimensional models to virtually develop an optimized virtual model arrangement of all of said plurality of items, wherein the optimized model arrangement comprises a second item selected from the plurality of items nested within the first item of the plurality of items;
calculate overall dimensions of said optimized virtual model arrangement using said three-dimensional models;
automatically design a customized package template based on said overall dimensions of said optimized virtual model arrangement; and
transmit said customized package template to a packaging production machine which in response creates a box template sized to house the plurality of items when the plurality of items are physically positioned in a manner corresponding to the optimized virtual model arrangement.

14. The system of claim 13, further comprising a packaging production machine communicatively coupled with said packaging customization engine and operable to create packaging templates from corrugated board based on said customized packaging template or the overall dimensions of said optimized model arrangement.

15. The system of claim 13, wherein optimizing said virtual model arrangement includes automatically:

producing multiple arrangements; and
selecting a particular model arrangement satisfying desired constraints.

16. The system of claim 13, wherein using said three-dimensional models to virtually develop an optimized virtual model arrangement of all of said plurality of items comprises producing a plurality of virtual model arrangements, calculating dimensions of each of the plurality of virtual model arrangements, and selecting a virtual model arrangement based on the calculated dimensions of each of the plurality of virtual model arrangements.

\* \* \* \* \*